US008855041B2

(12) United States Patent
Ninagawa (10) Patent No.: US 8,855,041 B2
(45) Date of Patent: Oct. 7, 2014

(54) RADIO RELAY STATION AND RADIO RELAY METHOD (75) Inventor: Takayasu Ninagawa, Daito (JP)

(73) Assignee: Kyocera Corporation, Kyoto (JP)

(*) Notice: Subject to any disclaimer, the term of this patent is extended or adjusted under 35 U.S.C. 154(b) by 423 days.

(21) Appl. No.: 13/259,506

(22) PCT Filed: Mar. 26, 2010

(86) PCT No.: PCT/JP2010/055453
§ 371 (c)(1),
(2), (4) Date: Sep. 23, 2011

(87) PCT Pub. No.: WO2010/110453
PCT Pub. Date: Sep. 30, 2010

(65) Prior Publication Data
US 2012/0020239 A1 Jan. 26, 2012

(30) Foreign Application Priority Data

Mar. 26, 2009 (JP) ................. 2009-077749

(51) Int. Cl.
H04B 7/14 (2006.01)
H04W 72/08 (2009.01)
H04B 7/155 (2006.01)
H04L 27/26 (2006.01)
H04L 5/14 (2006.01)
H04W 84/04 (2009.01)

(52) U.S. Cl.
CPC ......... H04B 7/15542 (2013.01); H04W 72/082 (2013.01); H04L 27/2601 (2013.01); H04L 5/14 (2013.01); H04W 84/047 (2013.01)
USPC ............................ 370/315; 370/203; 370/343

(58) Field of Classification Search
CPC ........................................................ H04B 7/14
USPC ......... 370/203, 210, 252, 315, 328, 330, 343, 370/401, 437, 465, 466, 480, 481, 492
See application file for complete search history.

(56) References Cited

U.S. PATENT DOCUMENTS

2005/0014464 A1* 1/2005 Larsson .................. 455/11.1
2007/0150928 A1* 6/2007 Hottinen .................. 725/127

(Continued)

FOREIGN PATENT DOCUMENTS

JP A-11-041122 2/1999
JP A-2004-349872 12/2004

(Continued)

OTHER PUBLICATIONS

International Search Report in International Application No. PCT/JP2010/055453; dated Apr. 27, 2010 (with English-language translation).

(Continued)

Primary Examiner — Kwang B Yao
Assistant Examiner — Nguyen Ngo
(74) Attorney, Agent, or Firm — Oliff PLC (57) ABSTRACT A radio relay station provided with: a donor-side transceiver unit which transmits and receives a donor-side signal, at which a first frequency band is used, to and from a radio base station; a service-side transceiver unit which transmits and receives a service-side signal, at which a second frequency band adjacent to the first frequency band is used, to and from a radio terminal; and a control unit and a control unit which control the donor-side transceiver unit and service-side transceiver unit respectively. The donor-side transceiver unit, when the service-side signal has been received, measures the signal level of the service-side signal at the first frequency band. The control unit and the control unit adjust the shift amount for the second frequency band at the frequency shifter so as to lower the signal level.

8 Claims, 8 Drawing Sheets

(56) References Cited

U.S. PATENT DOCUMENTS

| | | | |
|---|---|---|---|
| 2007/0280188 A1* | 12/2007 | Kang et al. | 370/338 |
| 2008/0212515 A1* | 9/2008 | Yomo et al. | 370/315 |
| 2008/0247478 A1* | 10/2008 | Lee et al. | 375/260 |
| 2009/0073915 A1 | 3/2009 | Zhang et al. | |
| 2009/0103428 A1* | 4/2009 | Kim et al. | 370/210 |
| 2009/0135933 A1* | 5/2009 | Miyoshi | 375/260 |
| 2010/0322140 A1* | 12/2010 | Kwon et al. | 370/315 |
| 2011/0032879 A1* | 2/2011 | Beaudin et al. | 370/328 |
| 2011/0151773 A1* | 6/2011 | Okuda | 455/9 |
| 2012/0008546 A1* | 1/2012 | Yokoyama et al. | 370/315 |
| 2012/0208452 A1 | 8/2012 | Nishio et al. | |
| 2012/0309390 A1* | 12/2012 | Saito et al. | 455/426.1 |
| 2013/0029589 A1* | 1/2013 | Bontu et al. | 455/7 |

FOREIGN PATENT DOCUMENTS

| | | |
|---|---|---|
| JP | A-2008-067386 | 3/2008 |
| JP | A-2008-177969 | 7/2008 |
| WO | WO 2006/088105 A1 | 8/2006 |

OTHER PUBLICATIONS

Japanese Office Action issued in Japanese Patent Application No. 2009-077749 dated Apr. 30, 2013 (w/ translation).

* cited by examiner

OCCURRENCE OF INTERFERENCES →F

FIG. 8

0 POINTS OF SIGNAL COMPONENTS COINCIDE WITH THOSE OF NOISE COMPONENTS →F

RADIO RELAY STATION AND RADIO RELAY METHOD

TECHNICAL FIELD

The present invention relates to a radio relay station and a radio relay method for relaying communications between a radio base station and a radio terminal.

BACKGROUND ART

Conventionally, a radio relay station has been widely used that relays communications between a radio base station and a radio terminal to enable the communications between the radio base station and the radio terminal in an indoor area or the like where a signal from the radio base station is difficult to reach (see Patent Document 1, for example).

Such a radio relay station includes a first transceiver unit that transmits and receives a signal (hereinafter, first signal) to and from a radio base station, and a second transceiver unit that transmits and receives a signal (hereinafter, second signal) to and from a radio terminal.

PRIOR ART DOCUMENT

Patent Document

Patent Document 1: Japanese Patent Application Publication No. 2008-67386 ([ABSTRACT], etc.)

SUMMARY OF INVENTION

However, if a frequency band (hereinafter, first frequency band) for the first signal and a frequency band (hereinafter, second frequency band) for the second signal are neighboring each other, for example, in the radio relay station, the second signal from the second transceiver unit is received as an interference signal by the first transceiver unit, whereas the first signal from the first transceiver unit is received as an interference signal by the second transceiver unit.

As a result, there has been a problem that the first transceiver unit and the second transceiver unit are influenced by interferences with each other.

Thus, an objective of the present invention is to provide a radio relay station and a radio relay method that can make the first transceiver unit and the second transceiver unit less affected by the interferences with each other.

In order to solve the problems described above, the present invention has the following feature. According to a feature of the present invention, there is provided a radio relay station configured to relay communications between a radio base station and a radio terminal, the radio relay station comprising: a first transceiver unit configured to transmit and receive a first signal for which a first frequency band is used, to and from the radio base station; a second transceiver unit configured to transmit and receive a second signal for which a second frequency band is used, to and from the radio terminal; and a controller configured to control the first transceiver unit and the second transceiver unit, wherein the second transceiver unit includes a frequency shifter configured to shift the second frequency band, when receiving the second signal from the second transceiver unit, the first transceiver unit measures a signal level of the second signal in the first frequency band, and the controller adjusts a shifting amount of the second frequency band in the frequency shifter so that the signal level measured by the first transceiver unit is lowered.

DESCRIPTION OF EMBODIMENTS

Next, a first embodiment, a second embodiment and other embodiments of the present invention will be described with reference to the drawings. Note that, in the following description of the drawings, same or similar reference signs denote same or similar elements and portions.

First Embodiment

In a first embodiment, descriptions are given on (1) an overview of a radio communication system, (2) a configuration of a radio relay station, (3) interference reduction processing, and (4) an operation flow of the radio relay station.

(1) Overview of Radio Communication System

Figure 1:
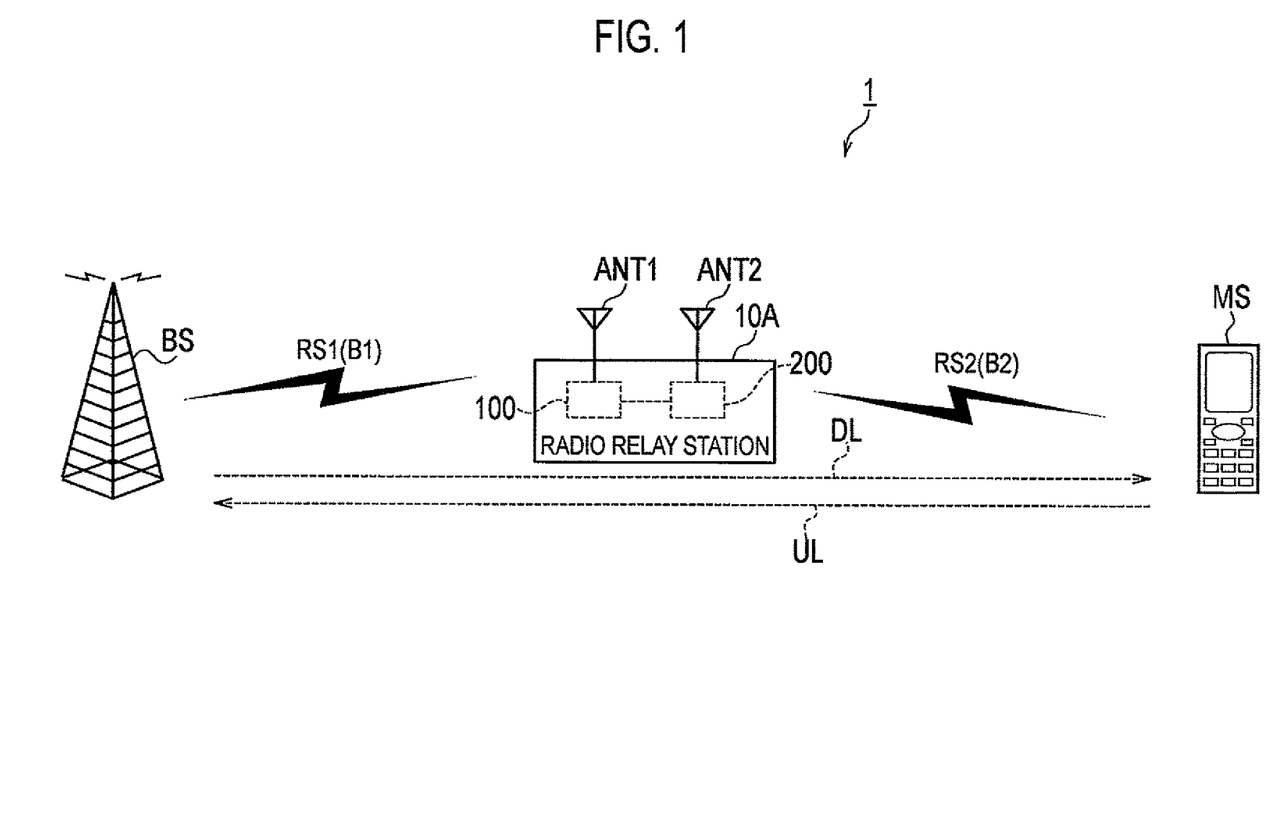
FIG. 1 is a schematic configuration diagram of a radio communication system according to a first embodiment of the present invention.

FIG. 1 is a schematic configuration diagram of a radio communication system 1 according to the first embodiment.

As shown in FIG. 1, the radio communication system 1 includes a radio relay station 10A, a radio base station BS, and a radio terminal MS. The radio communication system 1 has a configuration based on WiMAX (IEEE802.16). More specifically, the radio communication system 1 employs an orthogonal frequency division multiplexing (OFDM)/orthogonal frequency division multiplexing access (OFDMA) system, and a time division duplex (TDD) system.

The OFDM/OFDMA system (hereinafter, simply referred to as "OFDM system") is a system in which transmission data is dispersed into multiple subcarriers orthogonal to each other and each of the subcarriers are modulated. More specifically, an OFDM signal is generated by performing multiple PSK modulation or multi-level QAM modulation on each of the subcarriers and then performing inverse fast Fourier transform (IFFT) on each of the subcarriers on a transmitter side.

On the other hand, the OFDM signal is demodulated by performing fast Fourier transform (FFT) on a receiver side.

In the TDD system, an uplink (hereinafter, UL) communication and a downlink (hereinafter DL) communication are performed in a single communication frame in a time-division manner, whereby bidirectional communications are achieved.

The radio relay station 10A relays communications between the radio base station BS and the radio terminal MS. Thus, the radio terminal MS can communicate with the radio base station BS through the radio relay station 10A even when the radio terminal MS is located outside a communication area of the radio base station ES or in an end portion of the communication area.

The radio relay station 10A includes a donor-side transceiver unit 100 (first transceiver unit) that transmits and receives a donor-side signal RS1 (first signal) to and from the radio base station BS through a donor-side antenna ANT1, and a service-side transceiver unit 200 (second transceiver unit) that transmits and receives a service-side signal RS2 (second signal) to and from the radio terminal MS through a service-side antenna ANT2.

The donor-side signal RS1 is transmitted and received using a donor-side frequency band B1 (first frequency band). The service-side signal RS2 is transmitted and received using a service-side frequency band B2 (second frequency band) neighboring the donor-side frequency band B1.

The donor-side transceiver unit 100 performs radio connection to the radio base station BS. The donor-side transceiver unit 100 has a layer 1/layer 2 function similar as that in the radio terminal MS.

The service-side transceiver unit 200 performs radio connection to the radio terminal MS. The service-side transceiver unit 200 has a layer 1/layer 2 function similar as that in the radio base station BS. The service-side transceiver unit 200 transmits and receives the service-side signal RS2 in synchronization with the radio base station BS.

The radio relay station 10A is of a relatively small type to be installed in a home for example, and the donor-side transceiver unit 100 and the service-side transceiver unit 200 are contained in a single housing. Accordingly, the donor-side transceiver unit 100 and the service-side transceiver unit 200 perform radio transmission and reception in a relatively close distance.

Figure 2:
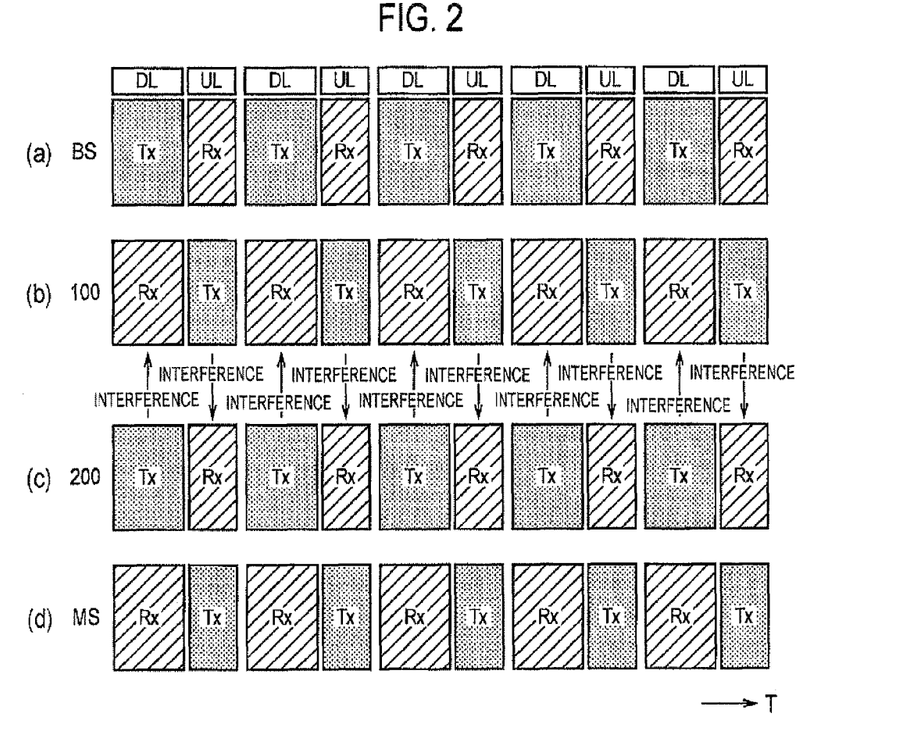
FIG. 2 is a time chart schematically showing a communication operation of the radio communication system according to the first embodiment of the present invention.

FIG. 2 is a time chart schematically showing a communication operation of the radio communication system 1.

As shown in FIG. 2, in the radio communication system 1 employing the TDD system, the donor-side transceiver unit 100 receives the donor-side signal RS1 from the radio base station BS ("Rx" in FIG. 2) and the service-side transceiver unit 200 transmits the service-side signal RS2 to the radio terminal MS ("Tx" is FIG. 2) during a DL communication time period.

The donor-side transceiver unit 100 transmits the donor-side signal RS1 to the radio base station BS and the service-side transceiver unit 200 receives the service-side signal RS2 from the radio terminal MS during a UL communication time period.

Because the donor-side frequency band B1 and the service-side frequency band B2 are neighboring each other, the service-side transceiver unit 200 interferes with the donor-side transceiver unit 100 during the DL communication time period and donor-side transceiver unit 100 interferes with the service-side transceiver unit 200 during the UL communication time period.

Figure 3:
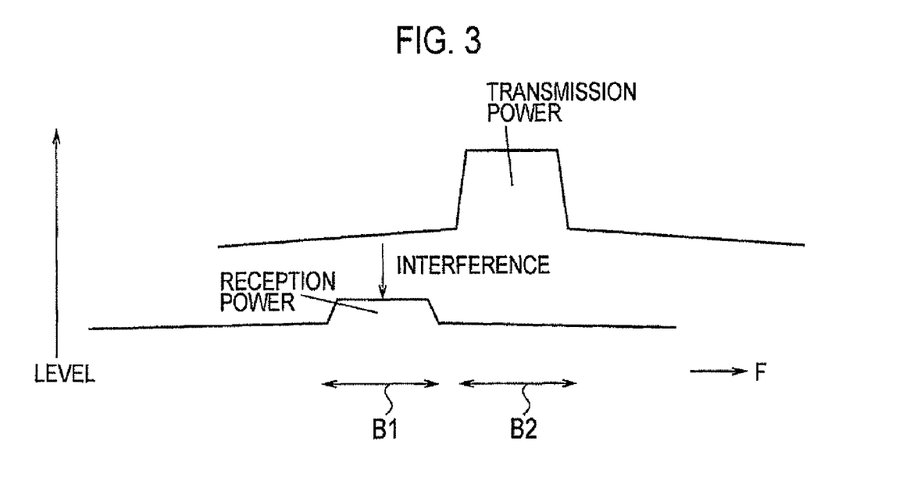
FIG. 3 is a diagram for explaining power condition of an interference generated in a radio relay station according to the first embodiment of the present invention.

FIG. 3 is a diagram for explaining power condition of an interference generated in the radio relay station 10A.

Regarding each of the donor-side transceiver unit 100 and the service-side transceiver unit 200, maximum transmission power is around 23 dBm and leakpower to the neighboring frequency band (hereinafter, referred to as "neighboring channel" as appropriate) is about 4 to −4 dBm.

Therefore, receptionpower for an interference signal from the donor-side transceiver unit 100 to the service-side transceiver unit 200 and reception power for an interference signal from the service-side transceiver unit 200 to the is donor-side transceiver unit 100 are about −10 to −20 dBm. In contrast, reception power for a desired signal that the donor-side transceiver unit 100 and the service-side transceiver unit 200 are supposed to receive is about −40 to −80 dBm.

Large power for the interference signal with respect to that for the desired signal as described above is one cause of the degradation of communication quality. In the first embodiment, a shift function for the service-side frequency band B2 is provided to avoid the influence of such interferences. For example, the influence of the interferences can be effectively reduced when the service-side signal RS2 becomes orthogonal to the donor-side Signal RS1 by shifting the service-side frequency band B2. It is to be noted that the service-side signal RS2 may not necessarily be orthogonal to the donor-side signal RS1.

(2) Configuration of Radio Relay Station

Figure 4:
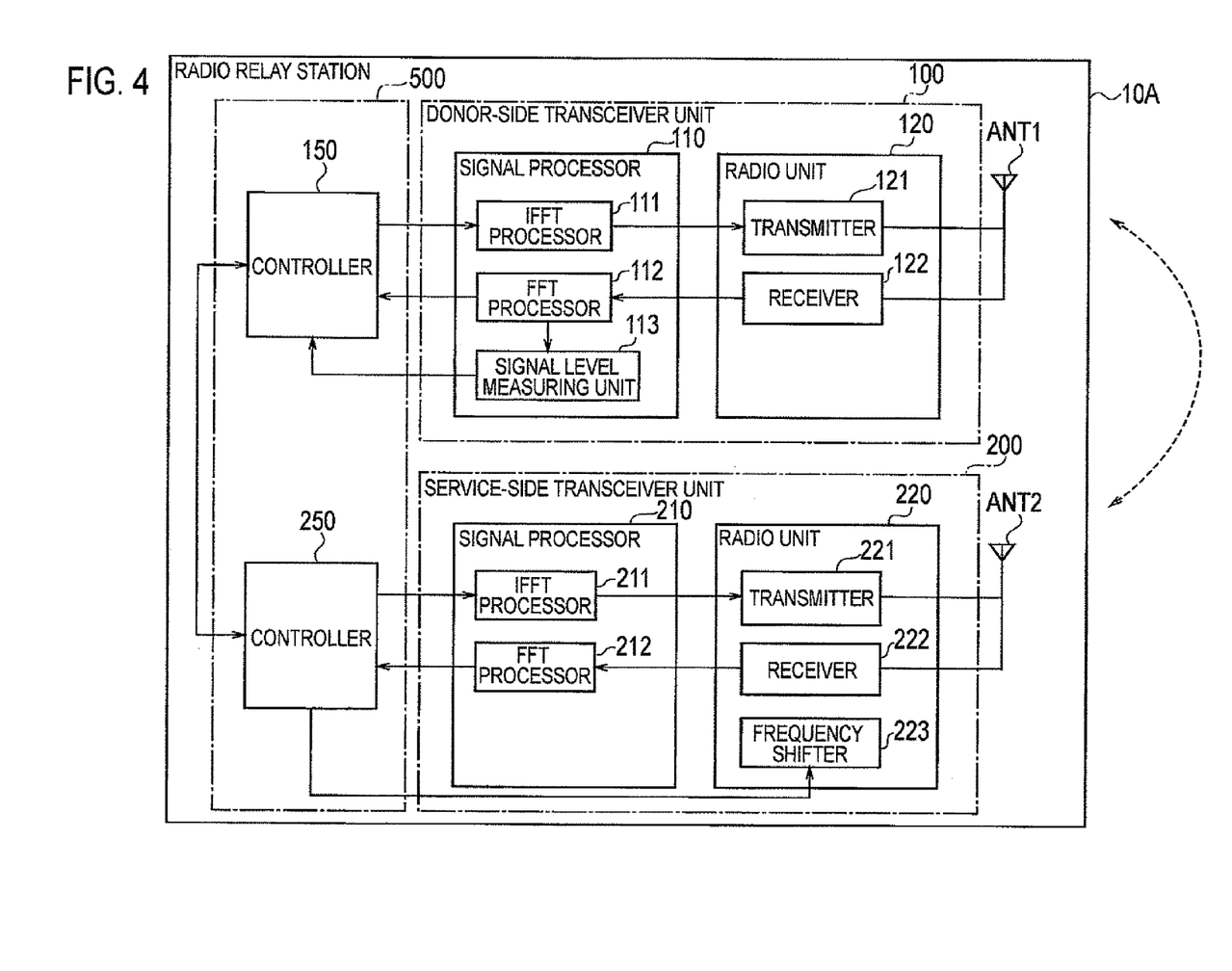
FIG. 4 is a block diagram showing a configuration of the radio relay station according to the first embodiment of the present invention.

FIG. 4 is a block diagram showing a configuration of the radio relay station 10A.

As shown in FIG. 4, the radio relay station 10A includes the donor-side antenna ANT1, the donor-side transceiver unit 100, a controller 150, the service-side antenna ANT2, the service-side transceiver unit 200, and a controller 250.

The controller 150 controls the donor-side transceiver unit 100. The controller 250 controls the service-side transceiver unit 200. In the present embodiment, the controller 150 and the controller 250 forms a controller 500 that controls the donor-side transceiver unit 100 and the service-side transceiver unit 200.

The donor-side transceiver unit 100 includes a signal processor 110 and a radio unit 120. The signal processor 110 processes the donor-side signal RS1 in a base band BB. The radio unit 120 processes the donor-side signal RS1 in a radio frequency (RF).

The signal processor 110 includes an IFFT processor 111, an FFT processor 112 and a signal level measuring unit 113. The radio unit 120 includes a transmitter 121 and a receiver 122.

Transmission data from the controller 150 is dispersed into multiple first subcarriers that are orthogonal to each other, modulated for each of the first subcarriers, and then is transformed into the donor-side signal RS1 by the IFFT by the IFFT processor 111. The donor-side signal RS1 thus obtained is transmitted through the donor-side antenna ANT1 after being up-converted to be in RF band and amplified in the transmitter 121.

On the other hand, the donor-side signal RS1 received by the donor-side antenna ANT1 is down-converted to be in the BB band from the RF band and then amplified in the receiver 122 and then is subjected to the FFT by the FFT processor 112. The donor-side signal RS1 is transformed into multiple first subcarriers by the FFT and then modulated for each of the first subcarriers to be inputted into the controller 150 as reception data.

In the first embodiment, the donor-side transceiver unit 100 can also perform reception processing for the service-side signal RS2. In this case, the service-side signal RS2 received by the donor-side antenna ANT1 is subjected to the FFT by the FFT processor 112 after being down-converted to be in the BB band from the RF band and then amplified in the receiver 122. The service-side signal RS2 after being subjected to the FFT is inputted in the signal level measuring unit 113.

The service-side transceiver unit 200 includes a signal processor 210 and a radio unit 220. The signal processor 210 processes the service-side signal RS2 in the base band BB. The radio unit 220 processes the service-side signal RS2 in the radio frequency (RF).

The signal processor 210 includes an IFFT processor 211 and an FFT processor 212. The radio unit 220 includes a transmitter 221, a receiver 222 and a frequency shifter 223.

Transmission data from the controller 250 is dispersed into multiple second subcarriers that are orthogonal to each other, modulated for each of the second subcarriers, and then is transformed into the service-side signal RS2 by the IFFT by the IFFT processor 211. The service-side signal RS2 thus obtained is transmitted through the service-side antenna ANT2 after being up-converted to be in RF band and amplified in the transmitter 221.

On the other hand, the service-side signal RS2 received by the service-side antenna ANT2 is down-converted to be in the BB band from the RF band and then amplified in the receiver 222 and then is subjected to the FFT by the FFT processor 212. The service-side signal RS2 is transformed into multiple second subcarriers by the FFT and then modulated for each of the second subcarriers to be inputted into the controller 150 as reception data.

The frequency shifter 223 shifts the service-side frequency band B2. Specifically, the frequency shifter 223 raises or lowers the service-side frequency band B2 from its initial value. The upper limit and the lower limit of the service-side frequency band B2 is pre-determined. Thus, the frequency shifter 223 shifts the service-side frequency band B2 within the range defined by the upper and the lower limit.

The signal level measuring unit 113 measures a signal level (i.e., interference level) of the service-side signal RS2 in the donor-side frequency band B1 when the donor-side transceiver unit 100 receives the service-side signal RS2 from the service-side transceiver unit 200.

Specifically, when the signal level measuring unit 113 measures the signal level of the service-side signal RS2, the FFT processor 212 performs the FFT for frequencies of the respective multiple first subcarriers. The signal level measured by the signal level measuring unit 113 is notified to the controller 500.

The controller 500 adjusts the amount of shifting the service-side frequency band B2 by the frequency shifter 223 to lower the signal level measured by the signal level measurement unit 113.

The process of adjusting the amount of shifting the service-side frequency band B2 by the frequency shifter 223 is performed when the donor-side transceiver unit 100 completes the connection (network entry) to the radio base station BS. The donor-side transceiver unit 100 receives the service-side signal. RS2 from the service-side transceiver unit 200 after the donor-side transceiver unit 100 is connected to the radio base station BS. Here, the case is described in this embodiment where the service-side signal RS2 is received from the service-side transceiver unit 200 before the radio terminal MS is connected to the service-side transceiver unit 200. Instead, the service-side signal RS2 may be received from the service-side transceiver unit 200 after the radio terminal MS is connected to the service-side transceiver unit 200.

To find the sifting amount leading to the lowest signal level, the controller 500 repeats the process of changing to lower the signal level measured by the signal level measuring unit 113. Specifically, the controller 500 makes the signal level measuring unit 113 measure the signal level multiple times while changing the shifting amount in the frequency shifter 223. The controller 500 determines the shifting amount set in the measurement in which the lowest signal level is measured among the multiple measurements as the final shifting amount to be set for the frequency shifter 223.

A condition in which the signal level measured by the signal level measuring unit 113 becomes small is, for example, a state where the donor-side signal. RS1 (or first subcarriers) and the service-side signal RS2 (or second subcarriers) are orthogonal to each other.

With the shifting amount adjustment process, the service-side transceiver unit 200 can perform radio communications with the radio terminal MS at the frequency orthogonal to that of the donor-side transceiver unit 100.

(3) Interference Reduction Process

An example of an interference reduction process in the radio relay station 10A is described below with reference to FIG. 5 to FIG. 8.

Figure 5:
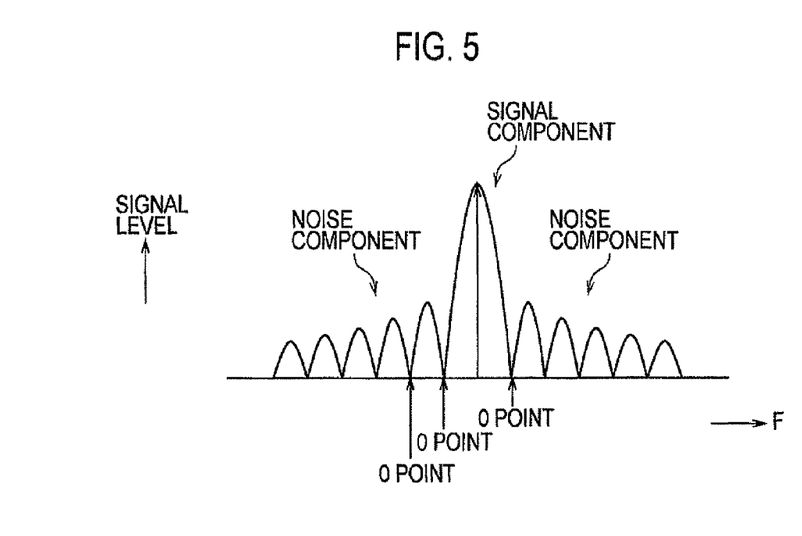
FIG. 5 is a diagram showing a frequency spectrum of a typical phase modulation signal.

FIG. 5 is a diagram showing a frequency spectrum of a typical phase modulation signal.

In FIG. 5, the actual signal component is indicated by an arrow at the center. A phase modulation signal has noise components generated before and after the actual signal component in addition to the frequency of the actual signal.

As show in FIG. 5, the noise components of the phase modulated signal each include points (hereinafter, 0 points) at which the signal level becomes zero at every predetermined frequency. The 0 points are proportional to the symbol period of the phase modulation. Thus, in signals having the same symbol period, the 0 points appear at the same frequencies. The OFDM system is a system in which multiple transmissions are performed with signals overlapped with one another at the 0 points.

Figure 6:
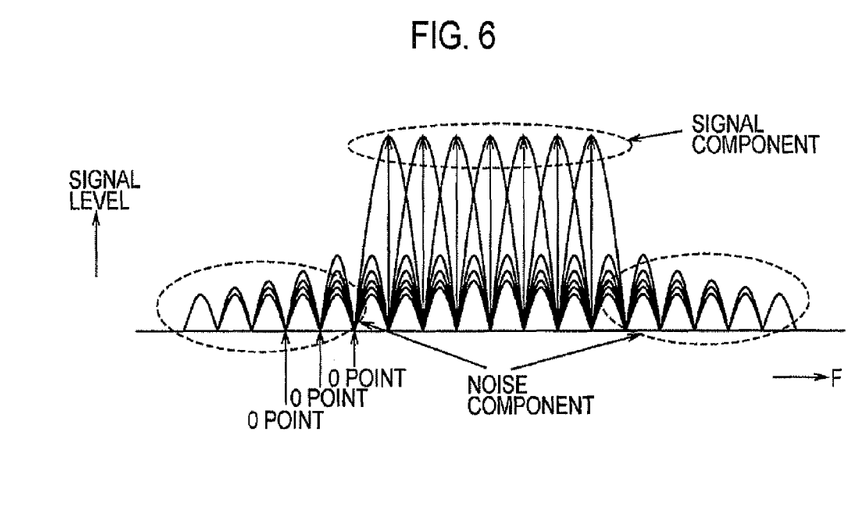
FIG. 6 is a diagram showing a frequency spectrum of an OFDM system.

FIG. 6 is a diagram showing a frequency spectrum of the OFDM system.

As shown in FIG. 6, if the other signals are overlapped (orthogonalized) with the 0 points, the signals can be transmitted without interfering with each other. A signal noise leaking outside the OFDM signal band also has 0 points at which the level is zero at every predetermined frequency.

Figure 7:
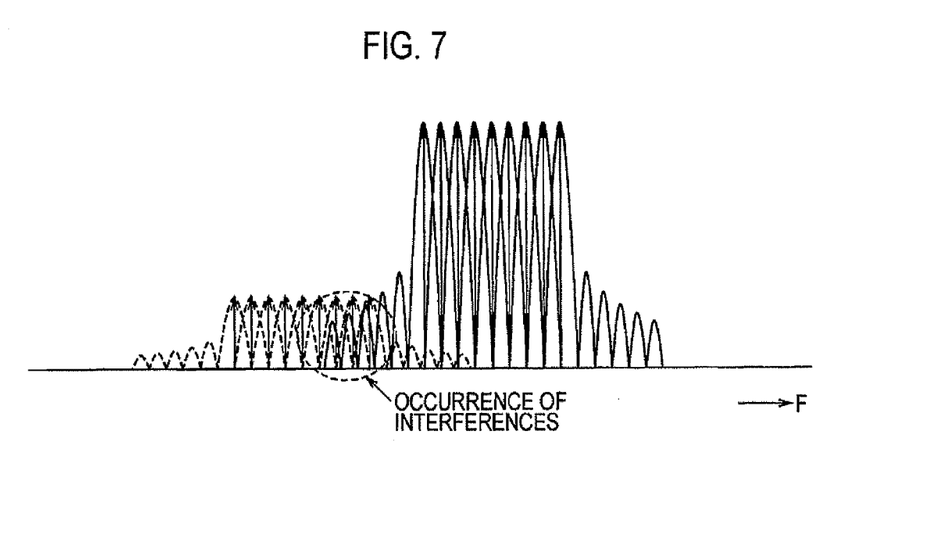
FIG. 7 is a diagram showing frequency spectrums of OFDM neighboring channels when interferences are generated.

FIG. 7 is a diagram showing frequency spectrums of OFDM neighboring channels when interferences are generated.

In the example of FIG. 7, the dotted line represents the reception signal (donor-side signal RS1) of the donor-side transceiver unit 100, and the solid line represents the transmission signal (service-side signal RS2) of the service-side transceiver unit 200.

Frequencies with orthogonality are generally not used for neighboring cells in the OFDM. Thus, noise of the transmission signal (service-side signal RS2) of the service-side transceiver unit 200 interferes with the reception signal (donor-side signal RS1) of the donor-side transceiver unit 100.

Figure 8:
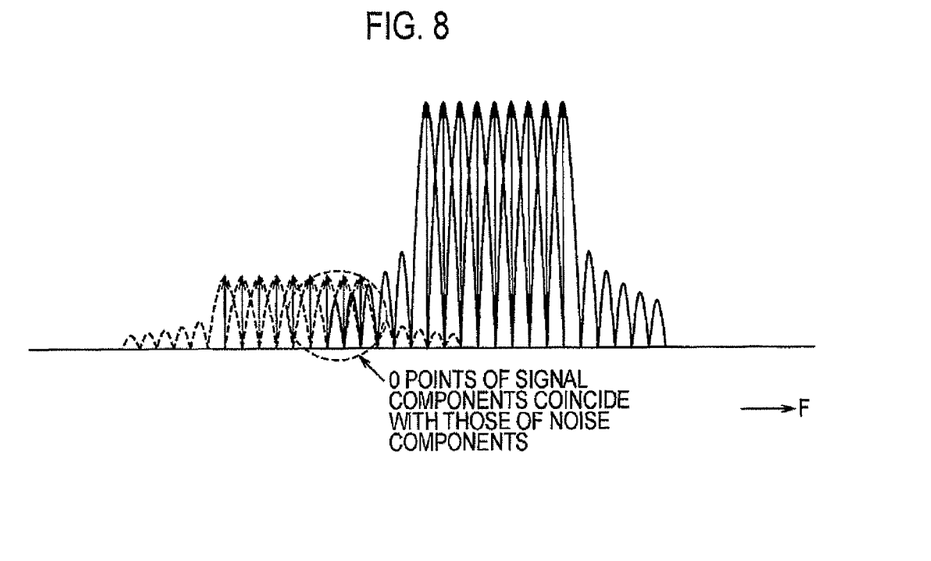
FIG. 8 is a diagram showing frequency spectrums of the OFDM neighboring channels in an orthogonal state.

FIG. 8 is a diagram showing frequency spectrums of the OFDM neighboring channels in an orthogonal state.

As shown in FIG. 8, the radio relay station 10A according to the first embodiment can orthogonalize the reception signal (donor-side signal RS1) of the donor-side transceiver unit 100 and the transmission signal (service-side signal RS2) of the service-side transceiver unit 200.

Thus, the 0 points of the noise of the transmission signal (service-side signal RS2) of the service-side transceiver unit 200 are overlapped with those of the signal components of the reception signal (donor-side signal RS1) of the donor-side transceiver unit 100, whereby the noise of the transmission signal (service-side signal RS2) of the service-side transceiver unit 200 does not interfere with the reception signal. Accordingly, the donor-side transceiver unit 100 can normally demodulate the reception signal (donor-side signal RS1) without being affected by the inter-carrier interference.

In addition, the 0 points of the noise of the transmission signal (donor-side signal RS1) of the donor-side transceiver unit 100 are overlapped with those of the signal components of the reception signal (service-side signal RS2) of the service-side transceiver unit 200, whereby the noise of the transmission signal (donor-side signal RS1) of the donor-side transceiver unit 100 does not interfere with the reception signal. Accordingly, the service-side transceiver unit 200 can normally demodulate the reception signal (service-side signal RS2) without being affected by the inter-carrier interference.

(4) Operation Flow of Radio Relay Station

Figure 9:
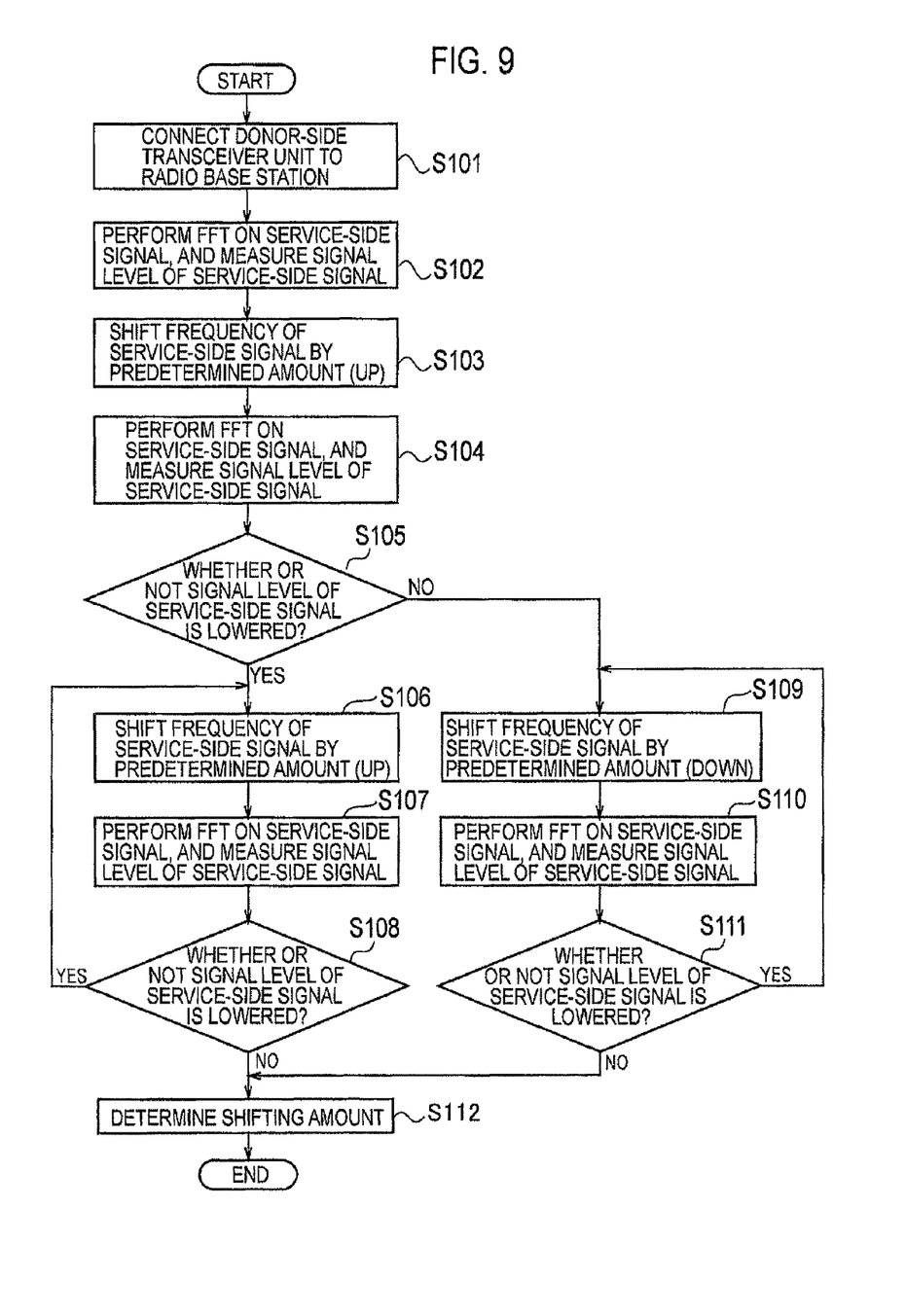
FIG. 9 is a flowchart showing an example of an operation of the radio relay station according to the first embodiment of the present invention.

FIG. 9 is a flowchart showing an example of an operation of the radio relay station 10A.

In Step S101, the donor-side transceiver unit 100 performs connection (network entry) to the radio base station BS. The donor-side transceiver unit 100 receives the service-side signal RS2 from the service-side transceiver unit 200.

In Step S102, the receiver 122 of the donor-side transceiver unit 100 down-converts the service-side signal RS2 received by the donor-side antenna ANT1 to be in the BB band from the RF band and amplifies the service-side signal RS2. The FFT processor 112 of the donor-side transceiver unit 100 performs the FFT on the service-side signal RS2 from the receiver 122. The signal level measuring unit 113 of the donor-side transceiver unit 100 measures the signal level of the service-side signal RS2 after the service-side signal RS2 is subjected to the FFT. The measured signal level is stored by the controller 500.

In Step S103, the controller 500 raises the service-side frequency band B2 by a predetermined amount from the initial value using the frequency shifter 223.

In Step S104 the donor-side transceiver unit 100 receives the service-side signal RS2 from the service-side transceiver unit 200. As in Step S102, the signal level measuring unit 113 of the donor-side transceiver unit 100 measures the signal level of the service-side signal RS2 after the service-side signal RS2 is subjected to the FFT. The measured signal level is notified to the controller 500.

In Step S105, the controller 500 determines whether or not the signal level measured in Step S104 is lower than the signal level measured in Step S102. When the signal level measured in Step S104 is lower than the signal level measured in Step S102, the process proceeds to Step S106. On the other hand, when the signal level measured in Step S104 is equal to or larger than the signal level measured in Step S102, the process proceeds to Step S109.

In Step S106, the controller 500 raises the service-side frequency band B2 by a predetermined amount from the initial value using the frequency shifter 223.

In Step S107, the donor-side transceiver unit 100 receives the service-side signal RS2 from the service-side transceiver unit 200. As in Step S102, the signal level measuring unit 113 of the donor-side transceiver unit 100 measures the signal level of the service-side signal RS2 after the service-side signal RS2 is subjected to the FFT. The measured signal level is notified to the controller 500.

In Step S108, the controller 500 determines whether or not the signal level measured in Step S107 is lower than the signal level measured in Step S104. When the signal level measured in Step S107 is lower than the signal level measured in Step S104, the process returns to Step S106. On the other hand, when the signal level measured in Step S107 is equal to or larger than the signal level measured in Step S104, the process proceeds to Step S112.

In Step S109, the controller 500 raises the service-side frequency band 132 by a predetermined amount from the initial value using the frequency shifter 223.

In Step S110, the donor-side transceiver unit 100 receives the service-side signal RS2 from the service-side transceiver unit 200. As in Step S102, the signal level measuring unit 113 of the donor-side transceiver unit 100 measures the signal level of the service-side signal RS2 after the service-side signal RS2 is subjected to the FFT. The measured signal level is notified to the controller 500.

In Step S111, the controller 500 determines whether or not the signal level measured in Step S110 is lower than the signal level measured in Step S102. When the signal level measured in Step S110 is lower than the signal level measured in Step S102, the process returns to Step S109. In Step S109 thereafter, the controller 500 further lowers the service-side frequency band B2 by a predetermined amount using the frequency shifter 223. On the other hand, when the signal level measured in Step S110 is equal to or larger than the signal level measured in Step S102, the process proceeds to Step S112.

In Step S112, the controller 500 determines the shifting amount set in the measurement in which the lowest signal level is measured among the multiple signal level measurements as the final shifting amount to be set for the frequency shifter 223.

In the present operation flow, the frequency is raised in Step S103. Instead, the frequency may be lowered in Step S103. In this case, the lowering of the frequency is performed in Step S106 in place of the raising of the frequency, whereas the raising of the frequency is performed in Step S109 in place of the lowering of the frequency.

As described above, in the first embodiment, the interferences can be avoided by orthogonalizing the donor-side signal RS1 and the service-side signal RS2 on the OFDM, for example. Thus, it is especially advantageous when neighboring channels exist in the TDD system. Furthermore, diversion to a system using another frequency band can be readily achieved because a filter circuit for reducing interferences is not necessarily required. Still furthermore, downsizing can be achieved because the filter circuit for reducing interferences is not necessarily required.

In the first embodiment, the donor-side transceiver unit 100 receives the service-side signal (RS2) from the service-side transceiver unit 200 before the radio terminal MS is connected to the service-side transceiver unit 200. Thus, the shifting amount in the frequency shifter 223 can be determined and the radio communications between the service-side transceiver unit 200 and the radio terminal MS can be prevented from being affected.

The radio terminal MS can comply with the service-side frequency band B2 on which the shifting amount is reflected when being connected to the service-side transceiver unit 200 by automatic frequency control.

In the first embodiment, the controller 500 makes the signal level measuring unit 113 measure the signal level multiple times while changing the shifting amount. The controller 500 determines the shifting amount set in the measurement in which the lowest signal level is measured among the multiple measurements as the final shifting amount to be set for the frequency shifter 223. Thus, an effective shifting amount can be automatically found.

Second Embodiment

Figure 10:
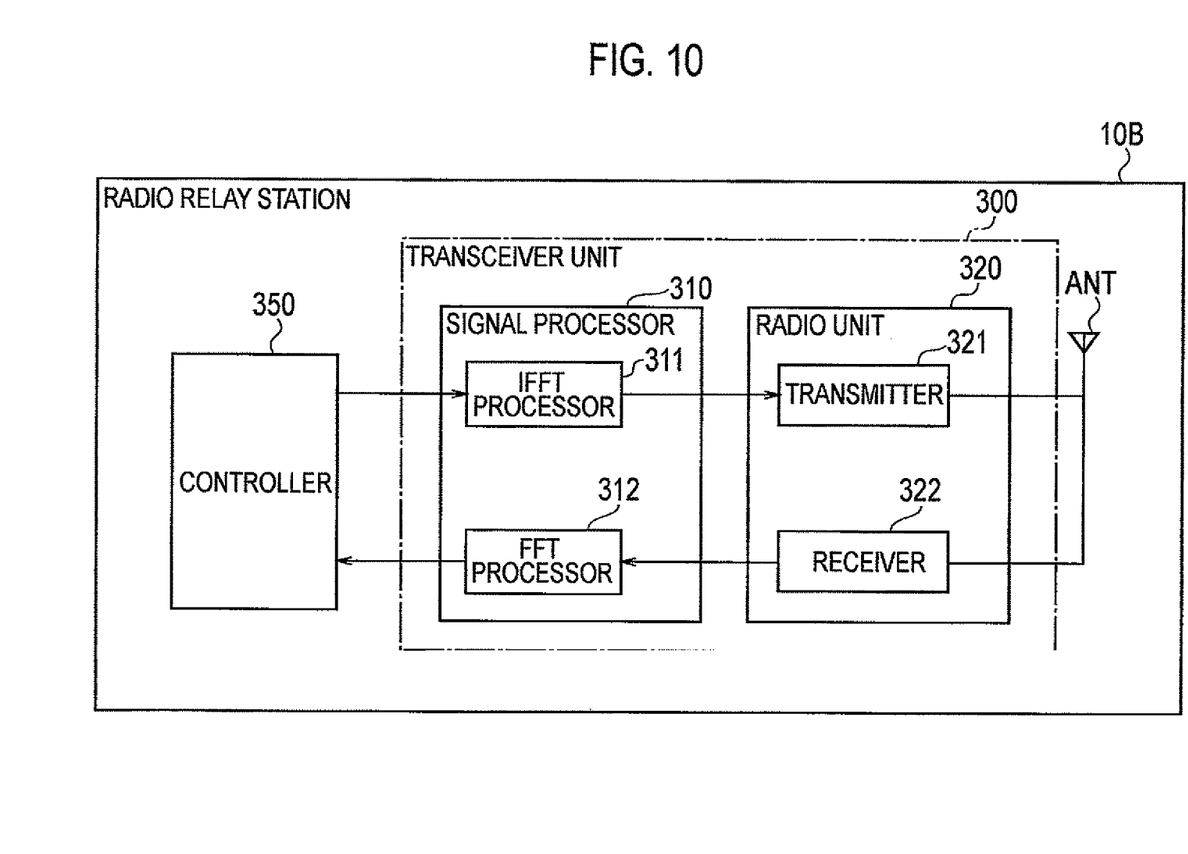
FIG. 10 is a block diagram showing a configuration of the radio relay station according to a second embodiment of the present invention.

In the second embodiment, only the points different from the first embodiment are described. FIG. 10 is a block diagram showing a configuration of a radio relay station 10B according to the second embodiment.

As shown in FIG. 10, the radio relay station 10B includes an antenna ANT, a transceiver unit 300, and a controller 350. Through the antenna ANT, the transceiver unit 300 transmits and receives the donor-side signal RS1 for which the donor-side frequency band B1 is used, to and from the radio base station BS and transmits and receives the service-side signal RS2 for which the service-side frequency band B2 neighboring the donor-side frequency band B1 is used, to and from the radio terminal MS. The controller 350 controls the transceiver unit 300.

In the second embodiment, the transceiver unit 300 transmits and receives the service-side signal RS2 orthogonal to the donor-side signal RS1 to and from the radio terminal MS.

The transceiver unit 300 includes a signal processor 310 and a radio unit 320. The signal processor 310 processes both the donor-side signal RS1 and the service-side signal RS2 in the BE band. The radio unit 320 processes both the donor-side signal RS1 and the service-side signal RS2 in the RF band.

The signal processor 310 includes an IFFT processor 311 and an FFT processor 312. By the IFFT, the IFFT processor 311 transforms the multiple first subcarriers that are orthogonal to each other into the donor-side signal RS1 and transforms the multiple second subcarriers that are orthogonal to each other into the service-side signal RS2.

Here, the IFFT processor 311 orthogonalizes the first subcarriers and the second subcarriers beforehand. Thus, the IFFT processor 311 is configured to perform the IFFT collectively on a frequency band which is a combination of the donor-side frequency band B1 and the service-side frequency band B2 (i.e. the frequency band doubled from the normal one) (see FIG. 11).

Through the FFT, the FFT processor 312 transforms the donor-side signal RS1 into the multiple first subcarriers that are orthogonal to each other and transforms the service-side signal RS2 into the multiple second subcarriers that are orthogonal to each other. The IFFT processor 312 is configured to perform the IFFT collectively on a frequency band which is a combination of the donor-side frequency band B1 and the service-side frequency band B2 (i.e., the frequency band doubled from the normal one) (see FIG. 11).

The radio unit 320 includes a transmitter 321 and a receiver 322. The transmitter 321 collectively up-converts the donor-side signal RS1 and the service-side signal RS2 from the IFFT processor 311 to be in the RF band, amplifies them, and transmits them through the antenna ANT. The receiver 322 collectively down-converts the donor-side signal RS1 and the service-side signal RS2 received by the antenna ANT to be in the BB band from the RF band and amplifies them.

Figure 11:
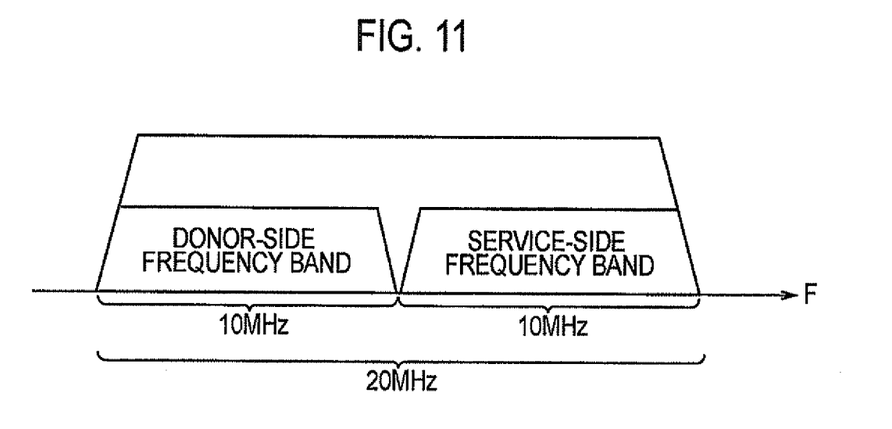
FIG. 11 is a flowchart showing an example of an operation of the radio relay station according to the second embodiment of the present invention.

An operation of the radio relay station 10B configured as such is described with reference to FIG. 11. In FIG. 11 entire band in the radio relay station 10A is assumed to be 20 MHz.

When the radio relay station 10B is connected to the radio base station BS and the frequencies synchronize, the donor-side frequency band B1 (10 MHz) is determined.

When the donor-side frequency band B1 is synchronized, the service-side frequency band B2 is also synchronized. Thus, the donor-side signal RS1 (first subcarriers) and the service-side signal RS2 (second subcarriers) can be orthogonalized in the radio relay station 10A.

As described above, with the radio relay station 10B, the donor-side signal RS1 and the service-side signal RS2 that are originally orthogonalized can be transmitted and received from the beginning with the shifting amount adjusting process as in the first embodiment omitted. Thus, in addition to the effect that can be obtained by the first embodiment, the effect of reducing the processing load of the radio relay station 10B can be obtained.

Other Embodiments

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

In the first embodiment, the configuration for adjusting the shifting amount in the frequency shifter 223 is described. It is to be noted that once the optimal shifting amount is determined, the radio relay station 10A may omit the shifting amount adjusting process thereafter with the shifting amount fixed.

In the first embodiment and the second embodiment, the IFFT is used to transform a signal (subcarriers)) in the frequency domain into a signal (the donor-side signal RS1 or the service-side signal RS2) in the time domain, whereas the FFT is used to transform the signal (the donor-side signal RS1 or the service-side signal RS2) in the time domain into the signal (subcarriers) in the frequency domain. It is to be noted that the present invention is not limited to the use of the FFT and DFT (Discrete Fourier Transform) and the like may be used.

In the embodiments, the radio communication system 1 based on WiMAX (IEEE802.16) is described. It is to be noted that the present invention can be applied to any radio communication systems such as next generation PHS (Personal Handyphone System) and LTE (Long Term Evolution) without being limited to WiMAX as long as the OFDM system is employed.

In the embodiments, the radio relay station 10A and the radio relay station 10B are described as being of a fixed mount type. The radio relay station 10A and the radio relay station 10B are not limited to the fixed mount type and may be a portable type radio relay station to be installed in a vehicle and the like.

As described above, the present invention naturally includes various embodiments which are not described herein. Accordingly, the technical scope of the present invention should be determined only by the matters to define the invention in the scope of claims regarded as appropriate based on the description.

INDUSTRIAL APPLICABILITY

As described above, the radio relay station and the radio relay method according to the present invention can make the first transceiver unit and the second transceiver unit in the radio base station less affected by the influence of the interferences with each other, and thus are advantageously used for radio communications such as mobile communications.

The invention claimed is:

1. A radio relay station configured to relay communications between a radio base station and a radio terminal, the radio relay station comprising: a first transceiver unit configured to transmit and receive a first signal for which a first frequency band is used, to and from the radio base station; a second transceiver unit configured to transmit and receive a second signal for which a second, frequency band is used, to and from the radio terminal; and a controller configured to control the first transceiver unit and the second transceiver unit, wherein the second transceiver unit includes a frequency shifter configured to shift the second frequency band, when receiving the second signal from the second transceiver unit, the first transceiver unit measures a signal level of the second signal in the first frequency band, and the controller adjusts a shifting amount of the second frequency band in the frequency shifter so that the signal level measured by the first transceiver unit is lowered, wherein the controller causes the first transceiver unit to make a plurality of measurements of the signal level while changing the shifting amount, and the controller determines the shifting amount set in a measurement in which the lowest signal level is measured among the plurality of measurements as the shifting amount to be set for the frequency shifter.

2. The radio relay station according to claim 1, wherein the first transceiver unit receives the second signal from the second transceiver unit after the first transceiver unit is connected to the radio base station and before the radio terminal is connected to the second transceiver unit.

3. The radio relay station according to claim 1, wherein the first signal includes a plurality of first subcarriers orthogonal to each other, the second signal includes a plurality of second subcarriers orthogonal to each other, and the controller controls the shifting amount so that the second subcarriers are orthogonal to the first subcarriers.

4. The radio relay station according to claim 3, wherein the first transceiver unit comprises: a Fourier transform unit configured to transform the first signal into the first subcarriers by Fourier transform; and a signal level measuring unit configured to measure the signal level of the second signal, and the signal level measuring unit measures the signal level of the second signal after the Fourier transform performed by the Fourier transform unit.

5. The radio relay station according to claim 1, wherein a time period during which the first transceiver unit receives the first signal and a time period during which the second transceiver unit transmits the second signal overlap with each other, and a time period during which the first transceiver unit transmits the first signal and a time period during which the second transceiver unit receives the second signal overlap with each other.

6. The radio relay station according to claim 1, wherein the first signal includes a plurality of first subcarriers orthogonal to each other, the second signal includes a plurality of second subcarriers orthogonal to each other, and the transceiver unit transmits and receives the second signal including the second subcarriers that are orthogonal to the first subcarriers to and from the radio terminal.

7. The radio relay station according to claim 6, wherein the transceiver unit comprises: an inverse Fourier transform unit configured to transform the first subcarriers into the first signal and transform the second subcarriers into the second signal by inverse Fourier transform; and a Fourier transform unit configured to transform the first signal into the first subcarriers and transform the second signal into the second subcarriers by Fourier transform.

8. A radio relay method for relaying communications between a radio base station and a radio terminal, the radio relay method comprising the steps of: transmitting and receiving, by a first transceiver unit, a first signal for which a first frequency band is used, to and from the radio base station; transmitting and receiving, by a second transceiver unit, a second signal for which a second frequency band is used, to and from the radio terminal; measuring, by the first transceiver unit, a signal level of the second signal in the first frequency band when receiving the second signal from the second transceiver unit; shifting the second frequency band by a frequency shifter provided to the second transceiver unit; and adjusting a shifting amount of the second frequency band in the frequency shifter so that the signal level measured in the measuring step is lowered, wherein a controller causes the first transceiver unit to make a plurality of measurements of the signal level while changing the shifting amount, and the controller determines the shifting amount set in a measurement in which the lowest signal level is measured among the plurality of measurements as the shifting amount to be set for the frequency shifter.

\* \* \* \* \*